(12) United States Patent
Salatandre

(10) Patent No.: US 11,636,301 B2
(45) Date of Patent: Apr. 25, 2023

(54) NFC GREETING CARD

(71) Applicant: Edgar Davin Salatandre, Toronto (CA)

(72) Inventor: Edgar Davin Salatandre, Toronto (CA)

( * ) Notice: Subject to any disclaimer, the term of this patent is extended or adjusted under 35 U.S.C. 154(b) by 0 days.

(21) Appl. No.: 16/570,405

(22) Filed: Sep. 13, 2019

(65) Prior Publication Data
US 2020/0090019 A1 Mar. 19, 2020

Related U.S. Application Data
(60) Provisional application No. 62/730,783, filed on Sep. 13, 2018.

(51) Int. Cl.
*G06K 19/06* (2006.01)
*G06K 19/07* (2006.01)

(52) U.S. Cl.
CPC ... G06K 19/0723 (2013.01); G06K 19/06037 (2013.01)

(58) Field of Classification Search
CPC .............................. G06K 19/00; G06K 19/067
USPC ........................................ 235/492, 487, 380
See application file for complete search history.

(56) References Cited

U.S. PATENT DOCUMENTS

| | | | | |
|---|---|---|---|---|
| 5,918,909 | A | * | 7/1999 | Fiala ................... H04M 17/026 283/67 |
| 7,024,807 | B2 | * | 4/2006 | Street ....................... G09F 1/10 40/124.06 |
| 2003/0150142 | A1 | * | 8/2003 | Street ....................... G09F 1/10 40/124.11 |
| 2006/0080871 | A1 | * | 4/2006 | McGoey ............. B42D 15/045 40/124.11 |
| 2013/0018726 | A1 | * | 1/2013 | Ionescu ................. G06Q 30/00 705/14.49 |
| 2013/0036635 | A1 | * | 2/2013 | Mayer ....................... G09F 9/30 40/124.06 |
| 2014/0113549 | A1 | * | 4/2014 | Beg ......................... H04W 4/12 455/41.1 |
| 2018/0018651 | A1 | * | 1/2018 | Nelson .................... G07F 17/26 |
| 2018/0077096 | A1 | * | 3/2018 | DeMattei ............ G06F 16/9566 |
| 2019/0001732 | A1 | * | 1/2019 | Ongsitco ............. B42D 15/022 |
| 2019/0332912 | A1 | * | 10/2019 | Walker .............. G06K 7/10386 |

* cited by examiner

*Primary Examiner* — Daniel St Cyr
(74) *Attorney, Agent, or Firm* — Head, Johnson, Kachigian & Wilkinson, PC

(57) ABSTRACT

A system including a plurality of items. Each item of the plurality of items bears a code unique to each item. The system also includes a computing facility adapted to, for each of the codes, receive a piece of content. The computing facility also is adapted to deliver up, upon receipt of indicia associated with a code to which content has been associated, the content.

5 Claims, 4 Drawing Sheets

---

| USE PHONE TO ACTIVATE NFC ON GIFT CARD TO ACCESS FACILITY | 20 |

| USE PIN TO UPLOAD CONTENT TO FACILITY AND ASSIGN SECURITY CHALLENGE QUESTION AND ANSWER TO CONTENT | 22 |

| REMOVE PIN FROM CARD TO SECURE CONTENT | 24 |

| GIVE CARD TO BENEFICIARY WHO MAY ACTIVATE NFC CODE TO PROVIDE SECURITY CHALLENGE ANSWER TO VIEW CONTENT | 26 |

| USE PHONE TO ACTIVATE NFC ON GIFT CARD TO ACCESS FACILITY | 20 |

| USE PIN TO UPLOAD CONTENT TO FACILITY AND ASSIGN SECURITY CHALLENGE QUESTION AND ANSWER TO CONTENT | 22 |

| REMOVE PIN FROM CARD TO SECURE CONTENT | 24 |

| GIVE CARD TO BENEFICIARY WHO MAY ACTIVATE NFC CODE TO PROVIDE SECURITY CHALLENGE ANSWER TO VIEW CONTENT | 26 |

NFC GREETING CARD

CROSS-REFERENCE TO RELATED APPLICATION

This application claims the benefit of U.S. Provisional Patent Application Ser. No. 62/730,783 filed Sep. 13, 2018.

BACKGROUND OF THE INVENTION

1. Field of the Invention

The invention relates to the field of greeting cards.

2. Prior Art

Greeting cards which include a combination recording and playback device are known.

SUMMARY OF THE INVENTION

Forming one aspect of the invention is a system comprising: (i) a plurality of items, each item of said plurality bearing a code unique to said each item; and (ii) a computing facility. The computing facility is adapted: to, for each of said codes, receive a piece of content; and to deliver up, upon receipt of indicia associated with a code to which content has been associated, said content.

According to another aspect of the invention, the code can be a URL.

According to another aspect of the invention, the computing facility can be adapted to communicate with a phone and is further adapted to deliver up to the phone, upon receipt of the indicia associated with a code to which content has been associated, the content.

According to another aspect of the invention, the indicia associated with a code to which content has been associated can be delivered up to the computing facility when the browser of the phone visits the location associated with the URL.

According to another aspect of the invention, the computing facility can be adapted to communicate with a phone and is further adapted, when the browser of the phone visits the location associated with the URL, to deliver to the phone instructions to generate an interface to prompt and facilitate the delivery of the content from the phone to the facility.

According to another aspect of the invention, the code can be defined by an NFC tag.

According to another aspect of the invention, the item can be a card.

According to another aspect of the invention, the card can be a gift tag or a greeting card.

According to another aspect of the invention, the URL defined by the NFC tag can also reproduced on the card in text and in the form of a QR code.

According to another aspect of the invention, a PIN can be associated with the card and the computing facility can be adapted to facilitate the delivery of the content from the phone to the facility only after the PIN is provided to the facility.

DETAILED DESCRIPTION OF THE EXEMPLARY EMBODIMENT

Overview

Figure 4:
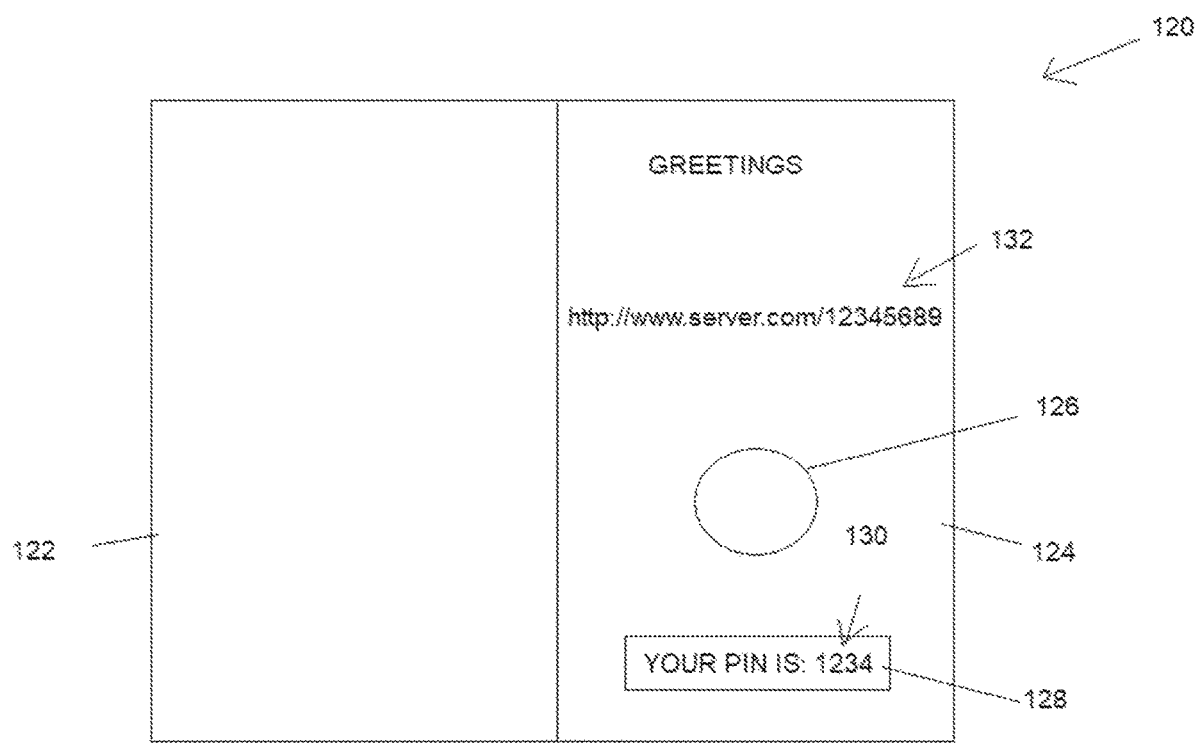
FIG. 4 is a diagrammatic view of the card of the present invention.

A greeting card 120, of the type having a front leaf 122 and a back leaf 124 is shown in FIG. 4 and forms an example embodiment. This card bears an NFC tag 126, wherein the sender, by tapping the NFC with a phone, can record a video message using the phone and a receiver, by tapping a phone to the NFC, can cause the video message to be shown on the phone.

Card Production:
  Each card includes an NFC tag as previously discussed.
  Each NFC tag is encoded with a URL containing a unique CARD ID. (eg. http://www.server.com/12345689).
  The URL is also borne by the card in the form of a QR code and in printed text as shown in 132 to permit use should the NFC function fail or not be available to the sender and/or recipient (eg. NFC device not compatible or phone battery low).
  A PIN (eg. 1234) and indicated by 130 is also associated with each unique CARD ID. This is a security feature which is required to upload and associate media to the card.
  The PIN is included with the card in a removable manner, in the form of a removable label 128.

Figure 2:
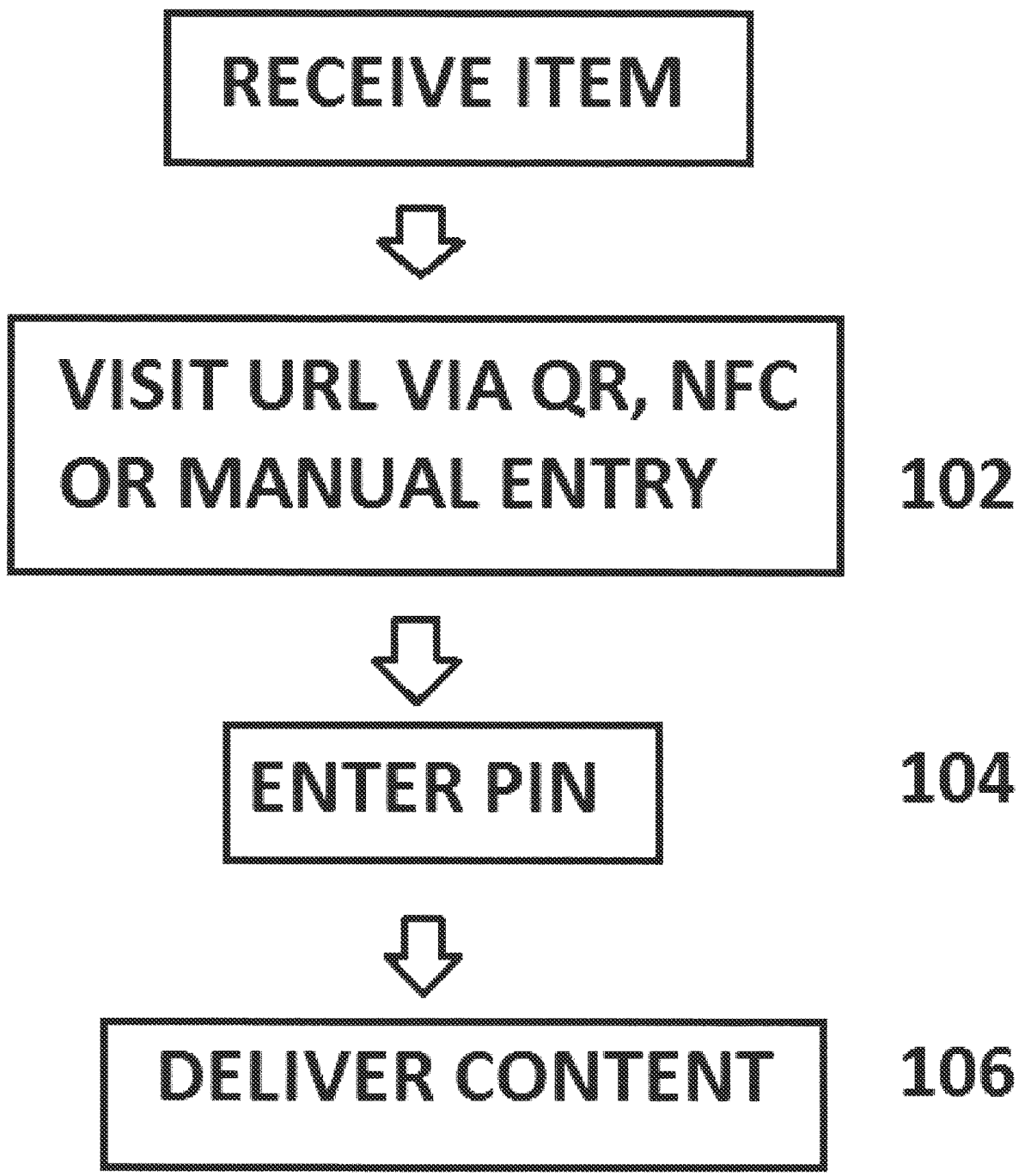
FIG. 2 is a flow chart showing the steps of a method that forms an aspect of the invention.
Figure 3:
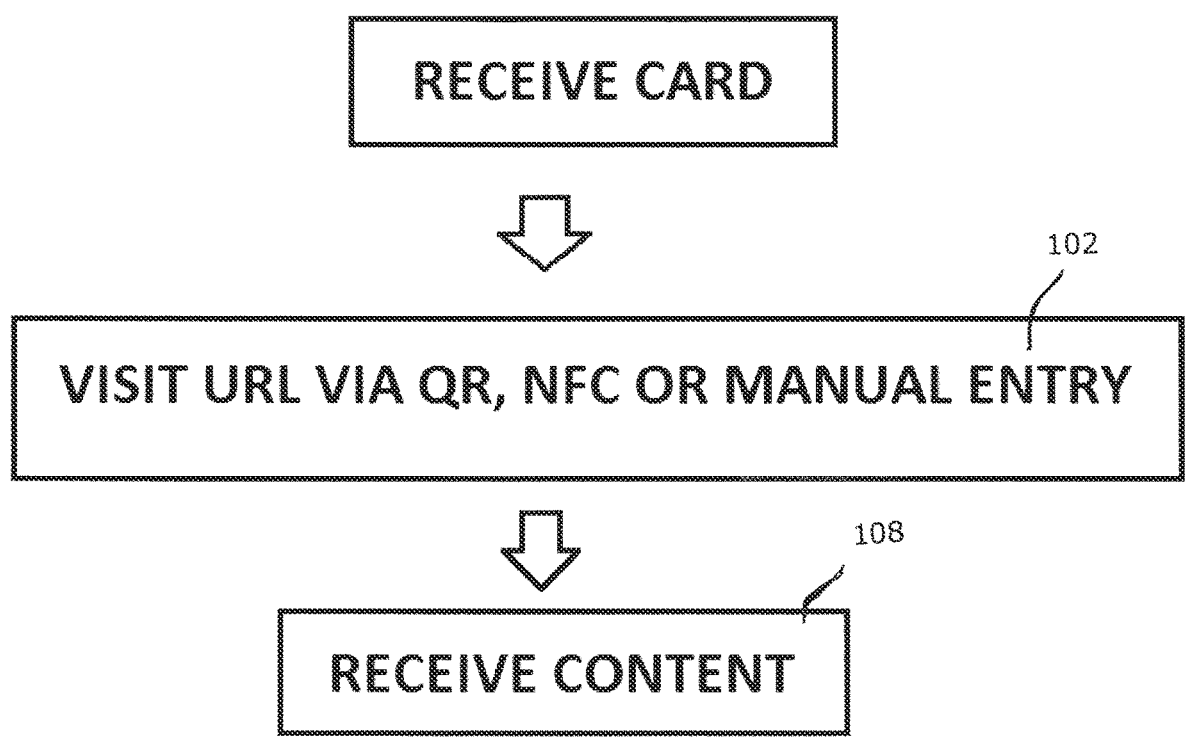
FIG. 3 is a flow chart showing the steps of another method that forms a different aspect of the invention.

Use
  The card can be used with a NFC enabled phone 36 or any device with a web browser. With an NFC enabled phone, a person that wishes to use the card can tap the card where indicated, as indicated by step 102 on FIG. 2 which will automatically direct the phone's default browser to the URL. Alternatively, the URL can be designated by text entry or use of the QR code. One of two interfaces will be displayed:
   if media has not been previously uploaded in association with the URL, an input box will pop-up asking for the PIN (included with the physical card) when the PIN has been entered correctly, as indicated by step 104 on FIG. 2 a RECORDING page will be shown
   In the event that media has been previously uploaded, and a password has not been assigned (discussed below), the media will be automatically shown, as indicated by 108 on FIG. 3; if a password has been assigned, an input box will pop-up, asking for the password; once the password has been entered, the media will be shown, and thereafter a PLAYBACK page will be shown Recording Page
  The following buttons will be accessible:
  NAME—allows the user to record a name for the intended recipient of the card for future reference
    MICROPHONE—allows the use to record a sound clip
    CAMERA—allows the user to record a photo
    VIDEO CAMERA—allows the user to record a video
    TEXT—Allows the user to record a written message
    BROWSE—allows the user to upload a file, either from the above or from the device SAVE—is accessible when a file has been uploaded, as indicated by 104 in FIG. 2. Actuation of save prompts the user to enter the PIN; upon entry of the PIN, the uploaded file is saved.

PASSWORD PROTECT—The sender will also have an option to write a security challenge question and answer. The answer will act as a password to allow the recipient to access the uploaded media. Eg. "What is my pet's name?" Answer (password): "Charlie". Without this password, the media cannot be viewed and is "private."

E-MAIL REGISTRATION/NOTIFICATION—The sender will also have a field to enter an e-mail address. This will allow for a few things 1. Notification when the recipient views the media (activates the NFC) 2 Notification if the PASSWORD is entered incorrectly. 3 If they need to change the media and forget the PIN #, they can use a "FORGET PIN" option, enter their email, and they will be emailed the PIN number so that they can access the RECORDING page.

VIEW PLAYBACK This will display the PLAYBACK page

BATCH—This function allows the sender to record media to a batch of cards instead of doing so individually. Pressing this button will show the names associated with all of the cards in the batch, if any, of which the current card forms part and also show buttons for adding and deleting cards from the batch. Adding a card to a batch will prompt an input box asking for the CARD ID, which can be manually keyed-in or scanned by NFC. The app will then ask the sender to key-in the PIN that is included with the physical card.

FINALIZE—This button allows the sender to bring an end to the edit function

Playback Page

Buttons available include:

SHARE This will allow the recipient to share the media via social media, email, etc. and will be visible only if the FINALIZE button has been selected REPLY If the sender entered an email in the RECORDING PAGE during the recording process and the finalize button has been selected, this button will appear and will allow a recipient to quickly send a reply message to that email address VIEW RECORDING PAGE This will display the RECORDING page Variations Whereas an embodiment is described in detail, variations are possible.

For example, any of the following content can be loaded:
a photo slideshow—the web server could allow for multiple photos to be uploaded as well as an MP3 file to be presented in a photo slideshow.
a URL forward—The sender can enter their own URL. When the recipient taps the NFC area of the card, they will be forwarded to the specified URL.
file share—the web server could allow for multiple files to be uploaded. The recipient is presented links to these files to download.
landing page—the web server can offer a web design wizard (online editor) to design a webpage on our web server. This could be a personal page, info page, a web form to collect RSVP to an event, etc.

A mobile app can be built in order to better facilitate the recording and uploading of the media. This would permit:
better upload management for large video files. If using the web browser option, you must keep the browser window open while uploading. Also uploading large files are often interrupted by connection drops and server timeouts—especially on mobile networks. What the mobile app can do is upload the files in the background and have resume upload capabilities should the connection drop or the server times out.
upload on WIFI. The app can be set to upload only when there is a WIFI connection. This will prevent using metered and costly mobile data.

The invention can also be incorporated as part of a custom printed fulfillment system wherein a user can upload a photo and a sound/video file as well as a written note—the photo and the written note can be printed on the video and program the sound/video on the musical greeting card before shipping.

Offer NFC greeting card products can be offered alongside where the sound/video file that the customer uploads is presented on the NFC device when the recipient taps the NFC area on the greeting card.

The card can be embodied with limited functionality, for example, only, the FINALIZATION could be omitted, and the SHARE and REPLY buttons be made visible whenever the PLAYBACK page is visible, thereby allowing repeated use.

Figure 1:
FIG. 1 shows a system 20 according to an embodiment of the invention that includes a card 22 and a computing facility 24.
Figure 1:
Figure 1:

In a particular embodiment, as indicated in FIG. 1, the card is a gift card which has an NFC tag and a PIN on a label which is removably attached to the card. As in 20, a phone is used to activate the NFC to access a facility. Thereafter, the PIN is used to upload content to the facility and to assign a security challenge question and answer to content, as in 22. The PIN card then be removed from the card to secure the content on the facility, as in 24. Thereafter, the card can be given to a beneficiary as in 26, who may activate the NFC code, whereupon the user will be prompted to provide a security challenge answer to a security challenge question; upon such provision, the content may be viewed.

Accordingly, the invention should be understood to be limited only by the accompanying claims, purposively construed.

What is claimed is:

1. A system comprising:
a plurality of unique URLs;
for each URL, a physical card and a PIN, the PIN being removable from the card and the URL being fixedly associated with the card;
a computing facility adapted such that:
upon the delivery of a PIN, the computing facility delivers instructions to generate an interface to permit the delivery of content to the computing facility;
upon the delivery of content to the computing facility using the interface, the computing facility associates the content with the URL for which the PIN was provided;
upon any visit, by a phone
to a URL of the plurality with which content has been associated, the facility delivers to said phone the content associated with the URL; and
to a URL with which content has not yet been associated, the computing facility delivers to said phone instructions to permit the delivery of the PIN to the computing facility, such that, upon said delivery of the PIN, the computing facility delivers to said phone the instructions to generate the interface to permit the delivery of content to the computing facility from said phone;
thereby to permit the creation of a card which permits an initial and subsequent recipients of the card to view content controlled by a sender of the card by removal of the PIN from the card by the sender prior to delivery of the card to the initial recipient.

2. The system according to claim 1, wherein the computing facility is adapted, upon a visit, by a phone, to a URL with which content has been associated, the computing facility delivers to the phone instructions to generate an interface to permit the delivery of the PIN provided for the URL.

3. The system of claim 1, wherein the URL is fixedly associated with the card by means of inclusion in one or more of: text fixed associated with the card; an NFC tag fixedly associated with the card; and a QR code fixedly associated with the card.

4. The system of claim 1, wherein the card is a gift tag or a greeting card.

5. The system of claim 1, wherein the computing facility is further adapted such that:
- upon the delivery of a PIN to the computing facility by a computer, the computing facility delivers to the computer instructions to generate an interface to permit the delivery of content to the computing facility from the computer;
- upon any visit, by a computer, to any URL of the plurality with which content has been associated, the facility delivers to the computer the content associated with the URL; and
- upon a visit, by a computer, to a URL with which content has not yet been associated, the computing facility delivers to the computer instructions to permit the delivery of the PIN to the computing facility.

* * * * *